United States Patent
Campbell

(10) Patent No.: US 7,562,177 B2
(45) Date of Patent: Jul. 14, 2009

(54) SIGNAL PROTOCOL ASSEMBLY

(75) Inventor: Gregory M. Campbell, Rochester Hills, MI (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 11/369,294

(22) Filed: Mar. 7, 2006

(65) Prior Publication Data

US 2007/0214304 A1    Sep. 13, 2007

(51) Int. Cl.
G06F 13/36 (2006.01)
H04M 11/00 (2006.01)
H04N 5/14 (2006.01)
H04Q 1/30 (2006.01)

(52) U.S. Cl. .................. 710/315; 379/93.07; 348/25; 340/7.32

(58) Field of Classification Search .................. 710/315; 379/93.07; 348/25; 340/7.32
See application file for complete search history.

(56) References Cited

U.S. PATENT DOCUMENTS

| | | | |
|---|---|---|---|
| 5,825,814 | A | 10/1998 | Detwiler et al. |
| 6,934,561 | B2 | 8/2005 | Burrus, IV |
| 2003/0218550 | A1 | 11/2003 | Herrmann |
| 2004/0121729 | A1 | 6/2004 | Herndon et al. |
| 2005/0084081 | A1 | 4/2005 | Manto |
| 2005/0099995 | A1 | 5/2005 | Blossom et al. |
| 2005/0149651 | A1 | 7/2005 | Doak et al. |
| 2005/0170808 | A1 | 8/2005 | Hamilton |
| 2005/0190708 | A1 | 9/2005 | Farr et al. |
| 2005/0203892 | A1 | 9/2005 | Wesley et al. |
| 2007/0010241 | A1* | 1/2007 | Wachter et al. ............. 455/423 |

OTHER PUBLICATIONS

Universal Serial Bus Specification, Revision 2.0; Compaq et al.; Apr. 27, 2000; Chapters 10-11; pp. 275-437.*

* cited by examiner

Primary Examiner—Mark Rinehart
Assistant Examiner—Jeremy S Cerullo
(74) Attorney, Agent, or Firm—Merchant & Gould P.C.

(57) ABSTRACT

A signal protocol assembly is adapted to bridge electronic communications across a plurality of communications platforms allowing a plurality of electronic devices to transfer data therebetween. The signal protocol assembly is electrically connected between the electronic communications device and a communications hub to help facilitate in the translation of communications from the electronic communications device to a third party independent communications protocol, and back when necessary. The signal protocol assembly includes a microprocessor for receiving data from each of the plurality of electronic devices. The signal protocol assembly also includes a plurality of ports electrically connected to the microprocessor for selectively connecting a portion of the plurality of electronic devices in electrical communication with the microprocessor. The signal protocol assembly also includes a processor port electrically connected to the microprocessor for bi-directionally transmitting data and for receiving power from the communications hub.

8 Claims, 3 Drawing Sheets

SIGNAL PROTOCOL ASSEMBLY

BACKGROUND ART

1. Field of the Invention

The invention generally relates to systems used to facilitate communication amongst electronic devices. More particularly, the invention relates to assemblies that facilitate the interoperability amongst electronic communication devices of varying communication protocol platforms.

2. Description of the Related Art

The internet has made vast amounts of information available to anyone virtually anywhere. Fiber optic systems inexpensively allow people around the world to communicate with each other, either through voice or data via the internet. Voice over internet protocol (VOIP) is a technology that allows people to communicate even more efficiently by utilizing the speed provided through the internet to transmit voice communication. All in all, the world is a much more connected environment.

Be that as it may, tragedies at the turn of the $21^{st}$ century illustrate the shortcomings of all of these communication networks. In particular, the terrorist attacks in the United States, the Asian tsunami, the earthquakes in Pakistan and India, and the devastations brought on to the southern portion of the United States due to hurricanes (including the flooding of New Orleans) illustrate that the communication networks currently available are inadequate because they do not operate with other systems. This prevents those that are first responders to tragedies from maximizing cooperative efforts to maximize the efforts made by all first responders. While the tragedies listed above are large in scope, first responders and those operating in smaller emergency situations encounter the same frustrations. Neighboring municipalities offering fire fighters to combat a fire often have difficulty communicating with each other. Kidnappings and school unrest often result in aggravation and frustration because initial information regarding the situation cannot be adequately disseminated.

Investments made by school districts and in municipalities in a particular communication technology are costly. With these types of governmental entities having smaller and smaller amounts of resources, they are not willing to abandon all investments in these technologies for the sake of being interoperable with other departments and/or other municipalities. This problem even exists in the differing agencies throughout the United States. By example, the National Guard may have difficulty communicating with the Army should both agencies be called to a particular emergency, which may be coordinated by a third civilian agency that cannot effectively communicate with responders from either organization.

One solution to this problem is to translate all of the electronic communications from one platform to another platform. This is difficult because the communications produced by the first platform that is being translated is not adapted to provide the necessary information to easily transform the communications into the other platform.

A second alternative solution to this problem is to connect all of the possible communication devices together whereby each of the communication devices are capable of communicating with each other. These systems are brought together in a command center type truck having racks of electronics that receive electronic signals to digitize them and place them in various protocols that would allow them to be received by electronic devices of differing platforms. These types of command centers are cost prohibitive and require huge amounts of coordination to get a command center to a particular site in time to aid those that are responding to the particular event.

The concept of a command center is counter-intuitive in many instances. Command centers are large and require a stable area from which to stage the communications effort. Once in place, a large amount of power is required. In emergency situations, power is not a given, so back-up power supplies are needed, further increasing the size and cost of a command center.

SUMMARY OF THE INVENTION

A signal protocol assembly is adapted to bridge electronic communications across a plurality of communications platforms allowing a plurality of electronic devices to transfer data therebetween. The signal protocol assembly includes a microprocessor for receiving data from each of the plurality of electronic devices. The signal protocol assembly also includes a plurality of ports electrically connected to the microprocessor for selectively connecting a portion of the plurality of electronic devices in electrical communication with the microprocessor. The signal protocol assembly also includes a processor port electrically connected to the microprocessor for bi-directionally transmitting data and for receiving power from a computer.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
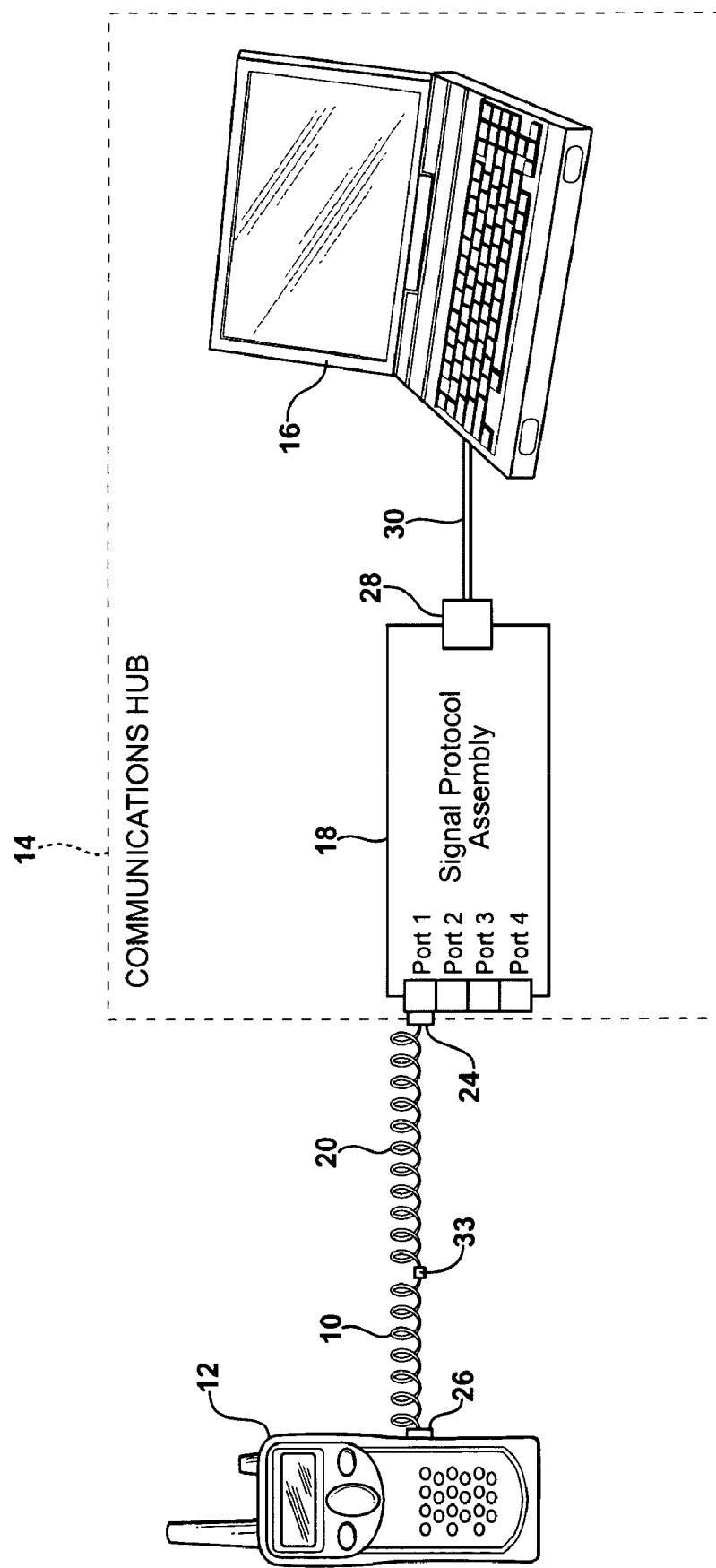
FIG. 1 is a schematic view of one embodiment of the invention connected between an electronic device and a computer.

Referring to FIG. 1, a cable 10 is shown adapted to transmit signals bi-directionally between an electronic communications device 12 and a communication hub 14. While FIG. 1 shows electronic communications device 12 to be a push-to-talk radio (commonly referred to as a "walkie-talkie") and a communications hub 14 as being a laptop computer 16 in electrical communication with a signal protocol assembly, generally indicated at 18, it should be appreciated by those skilled in the art that the electronic communications device 12 and the communications hub 14 may be devices other than what are shown here for illustrative purposes only. By way of example, a non-exhaustive list of electronic communication devices 12 may include cell phones, public address systems, stationary radio systems, mobile radio stations, pagers, PDAs, and the like. The laptop computer 16 may be any other type of computing device deemed necessary for a particular environment. Again, a non-exhaustive list of computing devices may include desk top computers, rack-mounted computing devices, dedicated communication electronics, and the like. The cable 10 is more fully described in co-pending patent application having attorney docket number 25688-103148, which shares the same inventorship and is assigned to the same assignee and is hereby incorporated by reference.

Figure 2:
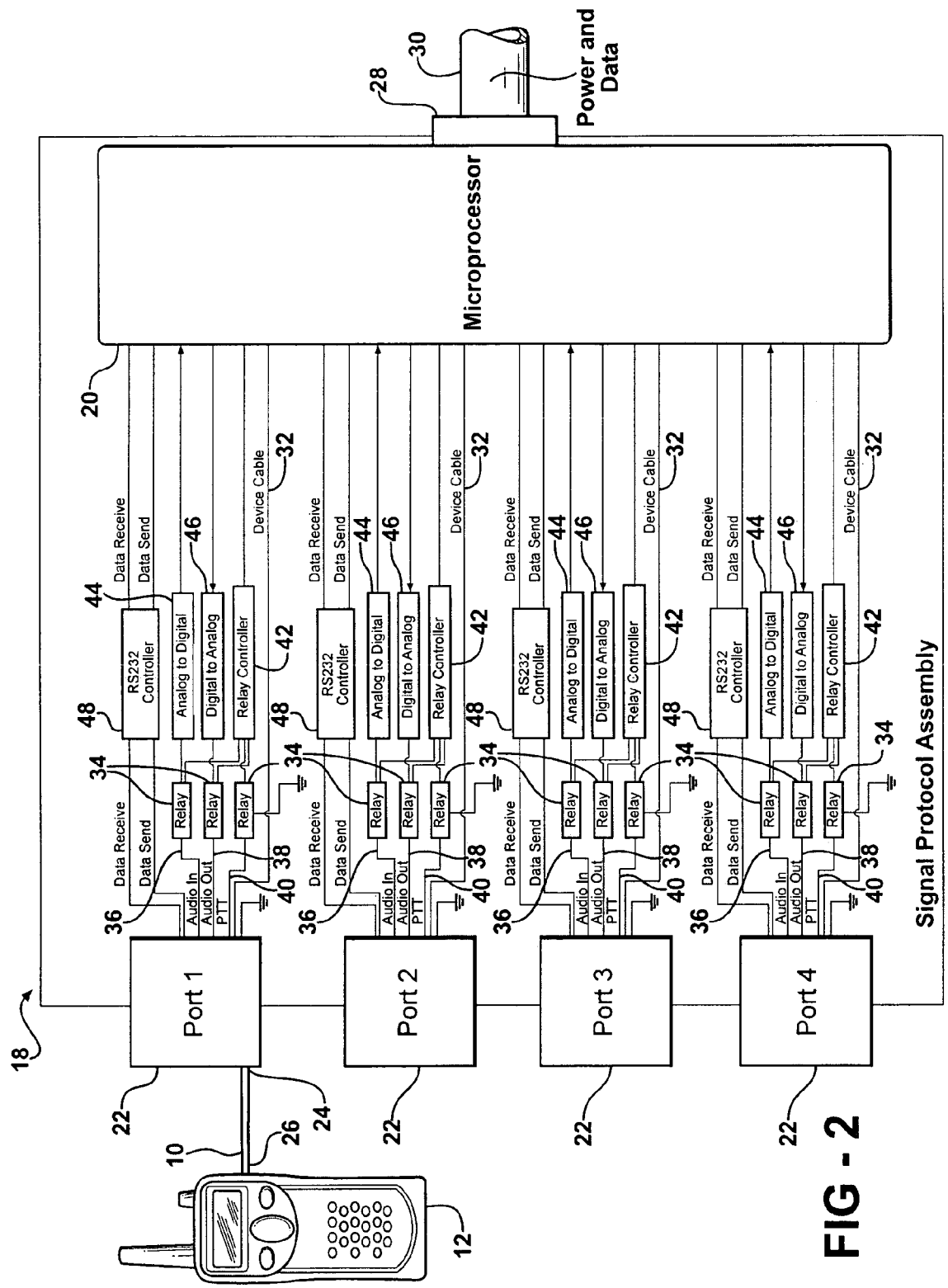
FIG. 2 is a schematic view of one embodiment of the invention.

Referring to FIG. 2, the signal protocol assembly 18 is shown in greater detail. This signal protocol assembly 18 includes a microprocessor 20 that receives data from each of the plurality of electronic devices 12. The microprocessor 20 is selectively connected to each of a portion of the plurality of electronic devices 12 when the cable 10 for the electronic device 12 is connected to one of a plurality of device ports 22. The device ports 22 are designed to receive the cable 10 allowing for the transfer of data between the microprocessor 20 (and eventually the laptop computer 16) and the electronic devices 12. Each of the device ports 22 is designed with a uniform configuration such that each of the different cables 10 that could be connected to the port 22 are capable of being connected to any one of the device ports 22. The cable 10 includes a hub end 24 which is identical, regardless of which type of electronic device 12 is being secured thereto at the other end, the device end 26. Said another way, regardless of the type of electronic device 12 being connected to the signal protocol assembly 18, the configuration of the cable 10 having a hub end 24 which is identical for every type of electronic device 12 may be connected to and electrically communicate with the microprocessor 20 through any one of the plurality of device ports 22.

The signal protocol assembly 18 also includes a processor port 28 that electrically connects the microprocessor 20 with another computing device, the laptop computer 16 in the embodiment shown in the Figures, for bi-directionally transmitting data between the microprocessor 20 and the laptop computer 16. The processor port 28 also is capable of receiving power from the laptop computer 16 (or whatever computing device 16 is used in the communications hub 14) through the processor port 28. This facilitates size reduction in the signal protocol assembly 18 because it does not require its own independent power source. The signal protocol assembly 18 relies on the power source of the laptop computer 16 to provide the power to run the microprocessor 20 and all the discreet elements within the signal protocol assembly 18. In one embodiment, the processor port 28 is a universal serial bus, commonly referred to as a USB port. With the USB connection, dedicated lines within a USB cable 30 will supply power to the signal protocol assembly 18 and other dedicated electrical conductors within the USB cable 30 will provide the path through which electronic data is transferred between the signal protocol assembly 18 and the laptop computer 16. It should be appreciated by those skilled in the art that other types of processor ports 28 that include both power transfer and data transfer may be utilized without changing the invention.

For the remainder of the discussion of the signal protocol assembly 18, reference will be made to a single port 22 identified in FIG. 2 as port 1. It should be appreciated that the other ports are identical to the first port. In fact, it should also be appreciated that there may be any number of device ports 22 incorporated into the signal protocol assembly 18 and that the signal protocol assembly 18 is in now way limited to four device ports 22.

The signal protocol assembly 18 includes a device cable 32 that is directly connected to the device port 22. The device cable 32 correlates with the identification cable described in the above-mentioned co-pending patent application that is inside the cable 10. The device cable 32 transmits the information received from the identification chip 33 (FIG. 1) inside the cable 10 whose identification information is transmitted through the identification cable therein. The identification of the electronic communications device 12 is sent through the device cable 32 directly to the microprocessor 20 so that it may control the rest of the conductors that are connected to the device ports 22 to receive electronic data from the electronic communications device 12. This will allow the microprocessor 20 to identify the electronic device and which of the plurality of communication platforms the electronic device 12 employs. By quickly identifying what type of electronic device 12 is being connected to the port 22, the microprocessor 20 may set the other devices (discussed subsequently) that exist between the device port 22 and the microprocessor 20 to the proper settings allowing the seamless transmission of data from the electronic communications device 12 to the microprocessor 20.

Because several electronic communication devices 12 require a physical switch to be thrown in order for the commencement of communication to be transferred between the electronic communication device 12 and another of the electronic communication devices 12, the signal protocol assembly 10 includes a plurality of relays 34. These relays 34 are used when the electronic communications device 12 incorporates switches to initiate and/or terminate the transmission of data. By way of example, if the electronic communications device 12 is a push-to-talk radio, commonly referred to as a "walkie talkie," the relays 34 will act as the push-to-talk switch on the electronic communications device 12 so that the electronic communications device 12 may properly receive and transmit data to the laptop computer 16 through the signal protocol assembly 18. The relays 34 are used for Audio In 36, Audio Out 38 and Push-to-Talk 40 inputs for the electronic communication device 12.

A relay controller 42 is electrically connected between the microprocessor 20 and each of the plurality of relays 34. The relay controller 42 receives a command signal from the microprocessor 20 to control the plurality of relays 34, depending on the action being taken. For example, if the microprocessor 20 is sending an electronic communication to the electronic communications device 12 wherein the electronic communications device 12 is a push-to-talk radio, the microprocessor 20 sends a signal to the relay controller 42 to trigger the relay 34 electrically connected to the push-to-talk connection 40. Once the signal is sent, the relay controller 42 then switches a second relay 34 to transmit a signal out of the Audio Out connection 38. In summary, the relay controller 42 orchestrates which of the plurality of relays 34 is to be turned on and off. It should be appreciated by those skilled in the art that while the embodiment shown in FIG. 2 illustrates a single relay controller for each of the plurality of device ports 22 an alternative embodiment would show a single relay controller 42 that orchestrates the relays 34 for all of the plurality of device ports 22.

To receive an audio signal in through the Audio In connection 36, the data transmitted therethrough is received by an analog to digital converter 44. The analog to digital converter 44 converts the signal received from the electronic communications device 12 into a digital signal before it is received by the microprocessor 20. Likewise, when the microprocessor 20 sends a signal to be eventually transmitted through the audio out connection 38, the digital signal created by the microprocessor 20 passes through a digital to analog converter 46. This allows the electronic signals created by the microprocessor 20 to be transformed into an analog signal which is received by the electronic communications device 12.

The signal protocol assembly 18 also includes a digital controller 48. The digital controller 48 receives and transmits data between the port 22 and the microprocessor 20. In the embodiment shown, the digital controller is an RS232 controller. The RS232 controller 48 is capable of transmitting and receiving electronic digital signals that would be transmitted or received from an electronics communications device 12 that is capable of receiving and transmitting digital signals. In the instance where the electronic communications device 12 transmits and receives digital signals, the data would be transmitted through the RS232 controller 48 and not through the Audio In 36, Audio Out 38 and Push-to-Talk 40 connections. Therefore, the relays 34, the analog to digital converter 44, the digital to analog converter 46 and the relay controller 42 would not be required or used when the electronic communication device 12 connected to the port 22 is a digital device.

Figure 3:
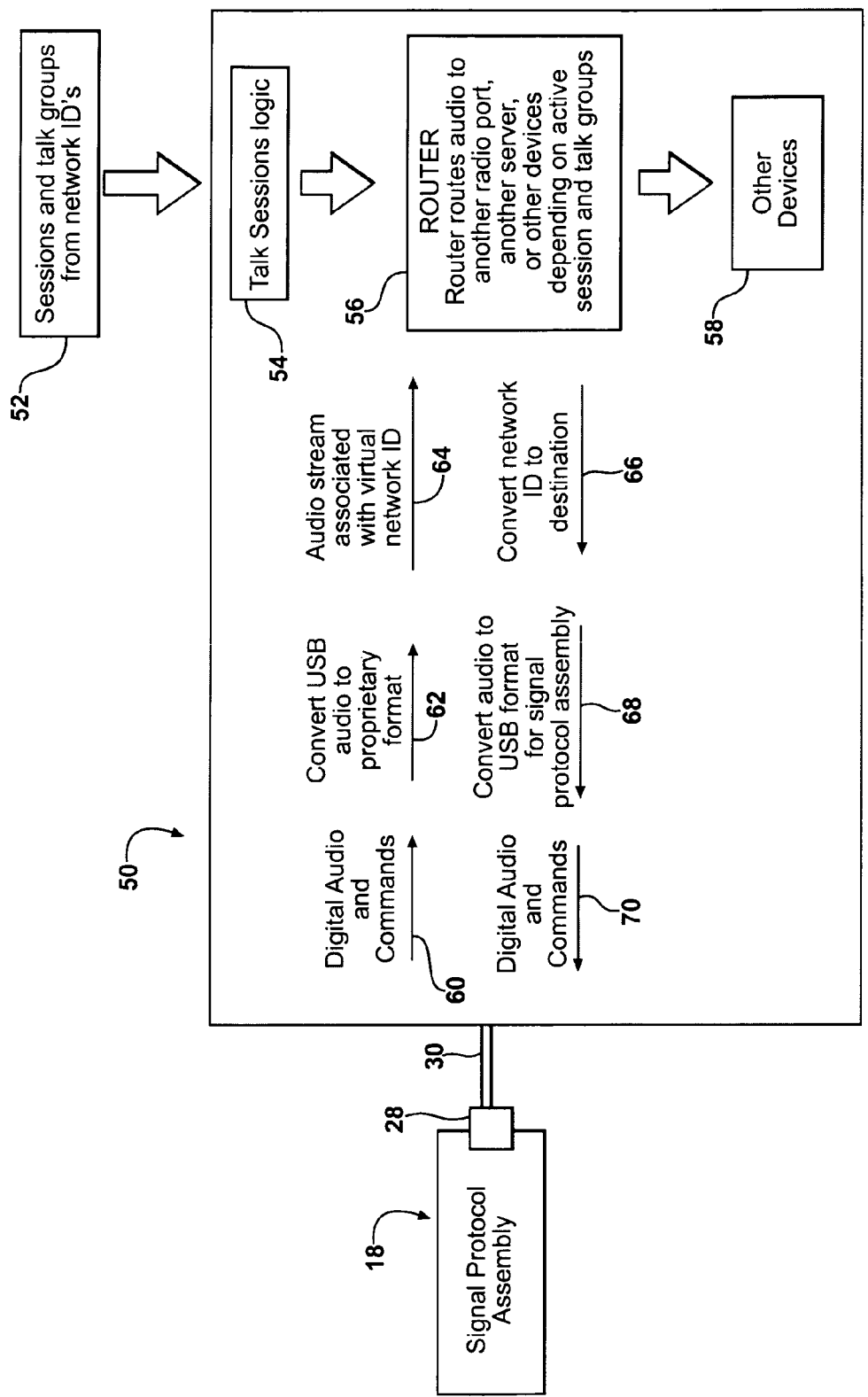
FIG. 3 is a schematic view of the invention in combination with a logic chart of operation relating to use of the invention.

Referring to FIG. 3, a graphic representation of the logic used to incorporate the invention into a system is graphically represented at 50, wherein the signal protocol assembly 18 is shown connected to the overall method through the USB cable 30 and the process report 28 as a matter of convenience. The method utilized includes the steps of identifying session and talk groups that are required to communicate with each other at 52. Session and talk groups may be defined as those persons, entities or groups thereof that need to communicate with each other for a particular purpose. Once these talk groups are identified with network IDs at 52, the talk sessions logic is employed at 54 to allow the communication between a plurality of different electronic communication devices 12. A router is employed at 56 to route the electronic signals to the appropriate electronic communications devices 12 to which the signals which are being processed by the method 50. Those electronic signals are then transmitted to the other electronic communication devices 12 at 58.

Singling out a single electronic communications device 12 that may be connected to the signal protocol assembly 18 in FIG. 3, the method 50 receives digital, audio and command signals at 60. These signals are converted through the USB port 28 into a proprietary format at 62. This step may be done by the microprocessor 20 or the laptop computer 16. The converted audio stream is identified to be associated with a virtual network ID at 64 which allows it to be associated with a particular talk group or network ID at 64 (the virtual network ID is assigned at step 52, discussed above). Likewise, once a network ID identifies the particular electronic communications device 12 that is connected to the signal protocol assembly 18, the network ID is designated at 66. The signals received from the network ID or talk group are then converted to a USB format for the signal protocol assembly at 68. Once converted, the digital audio and command signals are transmitted to the electronic communications device 12 at 70.

By use of the signal protocol assembly 18, an efficient and lightweight ability to create a network of devices including a plurality of different formats and protocols may be created allowing every participant in the network to communicate with the plurality of different electronic communication devices 12. Such a system as described above is highly mobile allowing networks to be created very quickly in any environment in which a laptop computer 16 can operate.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A signal protocol assembly adapted to bridge electronic communications across a plurality of communications platforms allowing a plurality of electronic devices to transfer data therebetween, said signal protocol assembly comprising:

a microprocessor for receiving data from each of the plurality of electronic devices;

a plurality of device ports electrically connected to said microprocessor for selectively connecting a portion of the plurality of electronic devices in electrical communication with said microprocessor;

a processor port electrically connected to the microprocessor for bi-directionally transmitting data and for receiving power from a computer;

an identification cable directly connecting each of said plurality of device ports to said microprocessor allowing said microprocessor to identify the electronic device and which of the plurality of communications platforms the electronic device employs;

a plurality of analog to digital converters wherein each of said plurality of analog to digital converters is electrically connected between a corresponding one of said plurality of ports and said microprocessor;

a plurality of digital to analog converters wherein each of said plurality of digital to analog converters is electrically connected between a corresponding one of said plurality of ports and said microprocessor;

a plurality of relays wherein each of said plurality of relays is electrically connected to each of said plurality of ports to facilitate push-to-talk features of a portion of the plurality of electronic devices; and a relay controller for controlling said plurality of relays which are used for the plurality of analog to digital converters, the plurality of digital to analog converters and the push-to-talk inputs for the plurality of electronic devices.

2. A signal protocol assembly as set forth in claim 1 including a plurality of digital controllers wherein each of said plurality of digital controllers is electrically connected between one of said plurality of ports and said microprocessor.

3. A signal protocol assembly as set forth in claim 1 wherein said processor port is a USB port.

4. A signal protocol assembly as set forth in claim 3 wherein the plurality of digital controllers includes a plurality of RS232 controllers.

5. A signal protocol assembly adapted to bridge electronic communications across a plurality of communications platforms allowing a plurality of electronic devices to transfer data therebetween, said signal protocol assembly comprising:

a microprocessor for receiving data from each of the plurality of electronic devices;

a plurality of device ports electrically connected to said microprocessor for selectively connecting a portion of the plurality of electronic devices in electrical communication with said microprocessor;

a processor port electrically connected to the microprocessor for bi-directionally transmitting data and for receiving power from a computer;

an identification cable directly connecting each of said plurality of device ports to said microprocessor allowing said microprocessor to identify the electronic device and which of the plurality of communications platforms the electronic device employs;

a plurality of analog to digital converters wherein each of said plurality of analog to digital converters is electrically connected between a corresponding one of said plurality of ports and said microprocessor;

a plurality of digital to analog converters wherein each of said plurality of digital to analog converters is electrically connected between a corresponding one of said plurality of ports and said microprocessor;

at least one plurality of relays wherein said at least one plurality of relays are electrically connected to a corresponding one of said plurality of ports to facilitate push-to-talk features of a portion of the plurality of electronic devices; and a relay controller for controlling said at least one plurality of relays which are used for a corresponding one of said plurality of analog to digital converters, a corresponding one of said plurality of digital to analog converters and the push-to-talk inputs for the plurality of electronic devices.

6. A signal protocol assembly as set forth in claim 5 including a plurality of digital controllers wherein each of said plurality of digital controllers is electrically connected between one of said plurality of ports and said microprocessor.

7. A signal protocol assembly as set forth in claim 5 wherein said processor port is a USB port.

8. A signal protocol assembly as set forth in claim 7 wherein the plurality of digital controllers includes a plurality of RS232 controllers.

* * * * *